United States Patent [19] [11] 3,727,461
Klingler [45] Apr. 17, 1973

[54] DISPOSABLE PLASTIC THERMOMETER

[75] Inventor: Josef F. Klingler, Wilmette, Ill.
[73] Assignee: Thermex, Inc., Chicago, Ill.
[22] Filed: Dec. 2, 1971
[21] Appl. No.: 204,335

Related U.S. Application Data

[63] Continuation of Ser. No. 872,855, Oct. 31, 1969, abandoned.

[52] U.S. Cl. .................................................73/371
[51] Int. Cl. .............................G01k 5/08, G01k 1/16
[58] Field of Search................................73/371, 372

[56] References Cited

UNITED STATES PATENTS 3,350,490   10/1967   LeBeau ..........................73/371 X
1,993,594   3/1935    Carson ..........................73/371 X Primary Examiner—Louis R. Prince
Assistant Examiner—Daniel M. Yasich
Attorney—Hofgren, Wegner, Allen, Stellman & McCord

[57] ABSTRACT

A low cost clinical thermometer formed primarily of molded plastic permitting one-time use thereof. The thermometer includes a tubular capillary portion and a bulb portion sealingly secured to the capillary portion. A metal sleeve is provided within the bulb portion for maintaining dimensional stability thereof and for maintaining the temperature of the liquid during readout of the thermometer. The capillary portion is defined by a capillary bore having an improved stepped end opening to the reservoir chamber of the bulb portion.

23 Claims, 5 Drawing Figures

PATENTED APR 17 1973 3,727,461
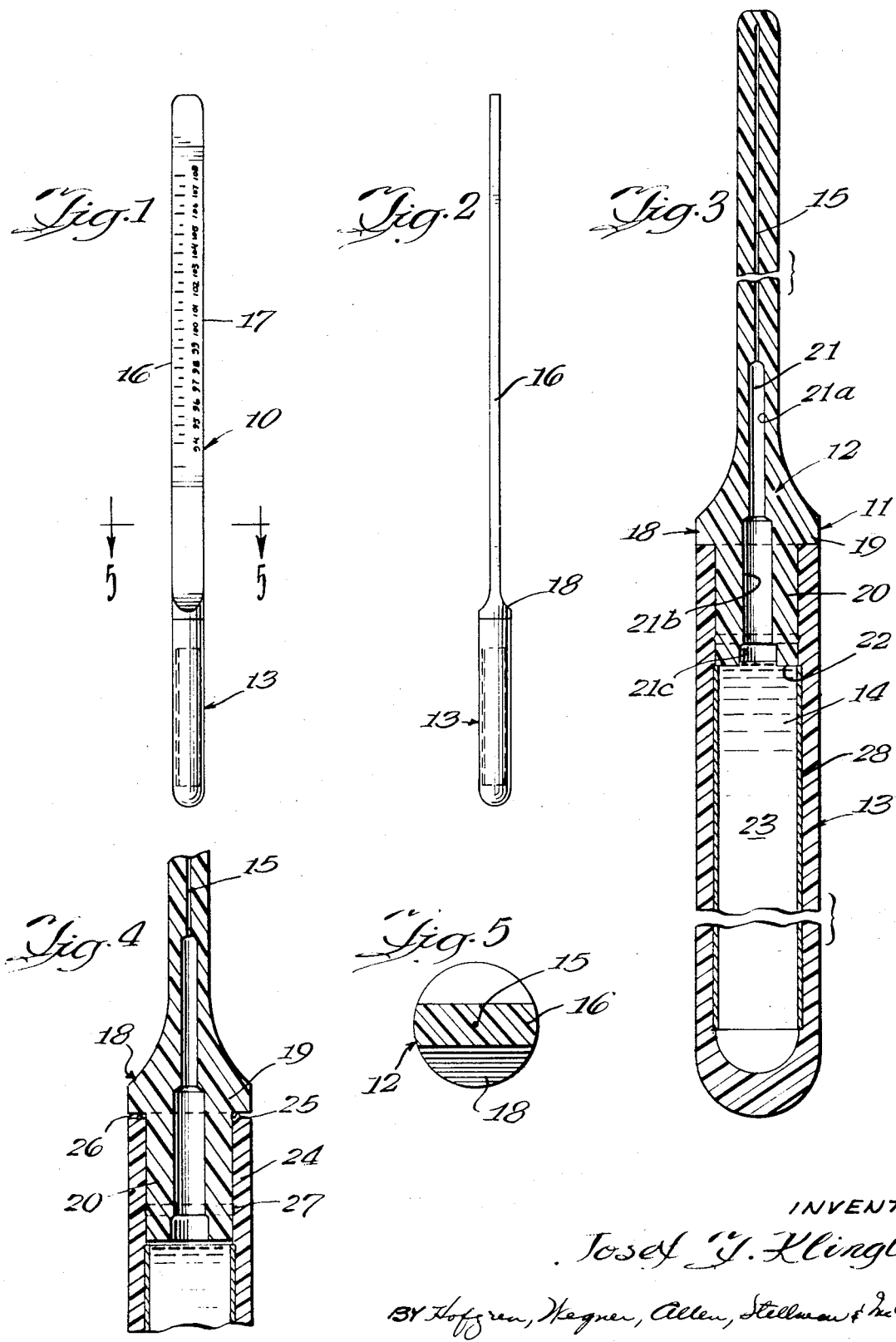
INVENTOR
Josef J. Klingler
BY Hofgren, Wegner, Allen, Stellman & McCord
ATTORNEYS

DISPOSABLE PLASTIC THERMOMETER

CROSS-REFERENCE TO RELATED APPLICATIONS

This application comprises a continuation of my copending application Ser. No. 872,855, filed Oct. 31, 1969, and now abandoned.

BACKGROUND OF THE INVENTION

1. Field of the Invention

This invention relates to thermometers and in particular to low cost clinical thermometers.

2. Description of the Prior Art

To avoid the expensive equipment and servicing requirements of conventional glass clinical thermometers, as well as to effectively eliminate risk of transmission of infectious organisms, it has been desirable to provide an inexpensive clinical thermometer permitting economical single use thereof. A number of attempts have been made to provide such low cost clinical thermometers. One example thereof is that disclosed in U.S. Pat. No. 3,350,490.

SUMMARY OF THE INVENTION

The present invention comprehends the provision of a low cost thermometer having a number of highly desirable improvements over the known thermometer constructions providing improved facility and accuracy in use.

More specifically, the present invention comprehends an improved thermometer construction wherein heat sink means are provided in the reservoir chamber of a bulb portion of the thermometer to be in thermal transfer association with the indicator liquid for effectively maintaining the temperature of the liquid during readout.

The invention further comprehends the provision of such a thermometer having new and improved means for effectively maintaining the volume of the reservoir chamber substantially constant notwithstanding subjection thereof to a wide range of temperatures. Thus, the present thermometer effectively avoids the thermal shock problems found in existing types of low cost clinical thermometers wherein inaccurate readings result from changes in the temperature of the liquid during readout and in the effective volume of the reservoir during readout.

The invention further comprehends an improved construction of the capillary bore in a capillary element portion of the thermometer effectively avoiding breaking of the column of indicator liquid in the capillary bore as commonly occurs in the conventional low cost clinical thermometers. More specifically, the present invention comprehends such a thermometer wherein the capillary bore defines at least three outwardly successively enlarged portions opening to the reservoir chamber with the indicator fluid sealing the reservoir and at least the outermost end of the outermost largest portion of the capillary bore down to relatively low temperatures, such as −15°F. The stepped capillary bore end construction effectively precludes breaking of the column of liquid indicator to assure accurate reading thereof in use.

BRIEF DESCRIPTION OF THE DRAWING

Other features and advantages of the invention will be apparent from the following description taken in connection with the accompanying drawing wherein:

FIG. 1 is a front elevation of a thermometer embodying the invention;

FIG. 2 is a side elevation thereof;

FIG. 3 is a fragmentary enlarged diametric section thereof;

FIG. 4 is a fragmentary section illustrating a step in the assembly of the thermometer elements; and FIG. 5 is a transverse section taken substantially along the line 5—5 of FIG. 1.

DESCRIPTION OF THE PREFERRED EMBODIMENT

In the exemplary embodiment of the invention as disclosed in the drawing, a thermometer generally designated 10 is shown to comprise a low cost clinical thermometer such as for use as an oral thermometer in hospitals and the like. By virtue of the extremely low cost, thermometer 10 may be utilized as a throw-away thermometer permitting the thermometer to be suitably discarded after a single use and thereby eliminating the need for subsequent sterilization, etc. The thermometer may be effectively packaged in sterile form by the manufacturer so as to maintain the sterility thereof until the time of use. Such sterile packaging techniques are well known to those skilled in the art and require no further discussion here.

The present thermometer comprises a two-part plastic enclosure structure generally designated 11 including a tubular capillary element portion 12 and a cup-shaped bulb portion 13. Each of the enclosure portions 12 and 13 is formed of a suitable sterilizable plastic. Portion 12 is formed of a transparent plastic permitting observation of an indicator liquid 14 within a capillary bore 15 extending axially within the capillary element. Capillary element 12 includes a readout portion 16 which is transversely flat as best seen in FIGS. 1 and 2, and which is provided with a suitable expanded scale, such as scale 17, indicating a range of temperatures from 94° to 108°F.

Capillary element 12 further includes an enlarged end portion 18 defining a cylindrical mid-portion 19 and a tubular projection 20 having an outside diameter slightly smaller than the outer diameter of mid-portion 19.

Capillary bore 15 opens at its lower end into a connecting portion 21 defined by three successively diametrically enlarged cylindrical portions 21a, 21b, and 21c. Enlarged capillary bore portion 21c opens coaxially through end surface 22 at the distal end of projection 20. Illustratively, where capillary bore 15 has a 9 mil diameter, enlarged bore portion 21a may have a 30 mil diameter; enlarged bore portion 21b may have a 60 mil diameter; and enlarged bore portion 21c may have an 80 mil diameter. The total length of capillary bore 15 may be approximately 4½ inches, with the enlarged portion 21 having a length of approximately five-eighths inch.

Bulb portion 13 effectively defines a reservoir chamber 23 which is effectively completely filled by the indicator liquid 14. Preferably the arrangement of chamber 23 and enlarged bore portion 21 is coordinated with the expansion characteristics of the indicator liquid 14 so that the indicator liquid 14 extends into at least the lower end of bore portion 21c notwithstanding the subjection of a thermometer to extremely low temperatures such as temperatures as low as −15°F.

As best seen in FIG. 4, the upper end 24 of bulb portion 13 may be provided with an annular rib 25 adapted to fuse into the lower surface 26 of the mid-portion 19 of the capillary element lower end 18 to define a positive sealed connection of the bulb portion 13 to the capillary element 12. The upper end 24 of the bulb portion has an inner diameter similar to the outer diameter of tubular projection 20 to provide a snug fit of the upper end 24 in telescoped association with the tubular projection. The tubular projection may be provided with an annular rib 27 providing increasing gripping engagement between bulb portion 24 and the tubular projection 20. Illustratively, rib 27 may have a width of approximately 15 mils and a height of approximately 4 mils. Capillary element 12 and bulb portion 13 are preferably formed of thermoplastic material permitting a heat fusion therebetween at surface 26. Illustratively, the elements may be formed of polystyrene.

Bulb portion 13 is provided with a tubular sleeve 28 effectively defining a liner surrounding the reservoir chamber 23. Sleeve 28 effectively defines the lateral surface of chamber 23 and is integrally associated with the plastic bulb portion 13 as by being embedded therein during the molding of the plastic bulb portion. Sleeve 28 is preferably formed of a material having a low coefficient of thermal expansion and a high thermal conductivity. Illustratively, sleeve 28 may be formed of metal. In the illustrated embodiment, sleeve 28 is formed of cold rolled steel.

Sleeve 28 further is preferably relatively rigid and, thus, effectively maintains dimensional stability of the reservoir chamber 23 notwithstanding the subjection of the bulb portion 13 to a substantial range of temperatures. Further, as a result of the high thermal conductivity of sleeve 28, the sleeve serves as a heat sink thereby effectively stabilizing the temperature of the indicator liquid 14 and providing facilitated heat transfer to and from the sleeve. Thus, during the readout of the thermometer, heat energy which may be dissipated from the liquid indicator 14 as by subjecting the thermometer to ambient atmosphere is substantially immediately replaced from the heat sink sleeve 28 thereby effectively maintaining the indicator liquid temperature and permitting improved accuracy in the readout of the patient's temperature. The plastic material of which the bulb portion 13 is formed preferably has a lower thermal conductivity and, thus, serves as a protective insulator to minimize heat transfer from the reservoir chamber outwardly through the bulb.

As thermometer 10 effectively eliminates breakup of the column of indicator liquid in the capillary bore, improved facility and accuracy in use of the thermometer is provided. Thus, it is unnecessary to employ conventional shaking techniques to restore the indicator liquid to an unbroken column at the expansion bulb end of the thermometer as is commonly required with conventional thermometers. Further, as the column is effectively prevented from breakup by withdrawal of the column completely into the reservoir chamber 23, thermal shock, such as during shipment wherein ambient temperatures may be down to approximately −15°F. or below does not affect the desired arrangement of the indicator liquid for immediate use without readying steps such as shaking the like as may be required in conventional thermometer constructions.

Thus, thermometer 10 is extremely simple and economical of construction while yet providing the highly desirable features discussed above.

The foregoing disclosure of specific embodiments is illustrative of the broad inventive concepts comprehended by the invention.

I claim:

1. A thermometer comprising:

a tubular capillary element formed of a transparent plastic and having an axial capillary bore closed at one end of the capillary element and defining at least three outwardly successively enlarged capillary bore portions within the opposite end of the capillary element;

a bulb element sealingly secured to said opposite end of the capillary element and having a reservoir chamber communicating with the outermost largest portion of said capillary bore; and expandable fluid filling said reservoir chamber and at least the outermost end of said outermost largest portion of said capillary bore at a preselected low temperature.

2. The thermometer of claim 1 wherein said enlarged bore portions are cylindrical.

3. The thermometer of claim 1 wherein said reservoir chamber comprises a cylindrical bore having a diameter larger than the largest of said capillary bore enlarged portions.

4. The thermometer of claim 1 wherein said bulb element includes an attaching portion formed of plastic material sealingly fused with the plastic material of said capillary element at said opposite end.

5. The thermometer of claim 1 wherein said plastic capillary element opposite end defines a cylindrical distal portion and said bulb element defines a tubular metal element and means securing said metal element to said plastic element end portion.

6. The thermometer of claim 1 wherein said capillary element opposite end is exteriorly cylindrical and said bulb element includes a cylindrical portion mating with and secured to said opposite end.

7. The thermometer of claim 1 wherein said bulb element comprises a plastic element thermally fused to said capillary element.

8. The thermometer of claim 1 wherein said low temperature is below approximately −15°F.

9. A thermometer comprising:

a tubular capillary element formed of a transparent plastic and having an axial capillary bore closed at one end of the capillary element and defining at least three outwardly successively enlarged portions at the opposite end of the capillary element;

a bulb element sealingly secured to said opposite end of the capillary element and having a reservoir chamber communicating with the outermost largest portion of said capillary element bore; and expandable fluid filling said reservoir chamber and at least the outermost end of said outermost largest portion of said capillary element bore at approximately −15°F., said bulb element being provided with an outer plastic portion and an inner metal liner confronting said reservoir chamber.

10. In a thermometer having a capillary portion, a bulb element comprising:
a plastic member defining a reservoir chamber for holding expandable fluid; and
a liner on the surface of said chamber, said liner being formed of a material having a coefficient of thermal expansion substantially less than that of the plastic of said member to provide dimensional stability of said reservoir chamber.

11. The thermometer structure of claim 10 wherein said liner is embedded in said plastic member.

12. The thermometer structure of claim 9 wherein said liner is formed of cold rolled steel.

13. The thermometer structure of claim 10 wherein said liner is formed of a thermally conductive material for absorbing heat energy and said member is formed of a plastic having low thermal conductivity for effectively maintaining the temperature of the fluid in said reservoir chamber during a readout operation.

14. The thermometer structure of claim 10 wherein said liner comprises a tubular sleeve.

15. The thermometer structure of claim 10 wherein said liner has a thickness of approximately 10 mils.

16. The thermometer structure of claim 10 wherein said liner has a thickness of approximately one-fourth that of said plastic member.

17. A thermometer comprising:
an elongate plastic enclosure defining an axial capillary bore and a reservoir chamber at one end of the bore;
an expandable liquid in said capillary bore and reservoir chamber; and
tubular heat sink means having a high thermal conductivity outwardly bounding said reservoir chamber in thermal transfer association with said liquid for effectively maintaining the temperature of said liquid during readout and facilitating heat transfer between the liquid in said reservoir chamber and the exterior of said enclosure.

18. The thermometer of claim 17 wherein said heat sink means further defines means having a low coefficient of thermal expansion for effectively maintaining the volume of said reservoir chamber substantially constant notwithstanding subjection thereof to a wide range of temperatures.

19. A thermometer comprising: a tubular capillary element formed of a transparent plastic and having a readout portion, an axial capillary bore extending through said readout portion, and defining a plurality of outwardly successively enlarged capillary bore portions at one end of the capillary element communicating in series with said readout portion bore, each of said bore portions being larger in cross-section than said capillary bore portion in said readout portion of said element; a bulb element extending from said end of the capillary element and having a noncapillary reservoir chamber communicating with the outermost, largest capillary bore portion; and expandable fluid filling said reservoir chamber and extending into at least the outermost end of said outermost largest portion of said capillary bore at a preselected low temperature.

20. The thermometer of claim 19 wherein the capillary bore is sealingly closed at the end opposite said one end.

21. The thermometer of claim 19 wherein the bulb element is sealingly secured to said one end of the capillary element.

22. The thermometer of claim 19 wherein said noncapillary reservoir chamber has a cross-sectional area substantially greater than the cross-sectional area of said outermost end of the outermost largest portion of said capillary bore.

23. A thermometer comprising: a tubular capillary element formed of a transparent plastic and having an axial capillary bore defining a plurality of outwardly successively enlarged capillary bore portions within one end of the capillary element; a bulb element extending from said end of the capillary element and having a reservoir chamber communicating with the outermost largest portion of said capillary bore; and expandable fluid filling said reservoir chamber and extending into at least the outermost end of said outermost largest portion of said capillary bore at a preselected low temperature, said bulb element comprising a metal element defining the lateral boundary of the reservoir chamber and extending coaxially from said outermost largest portion of the capillary bore, and means fixedly connecting the metal element to said one end of the capillary element.

* * * * *